Figure 2:
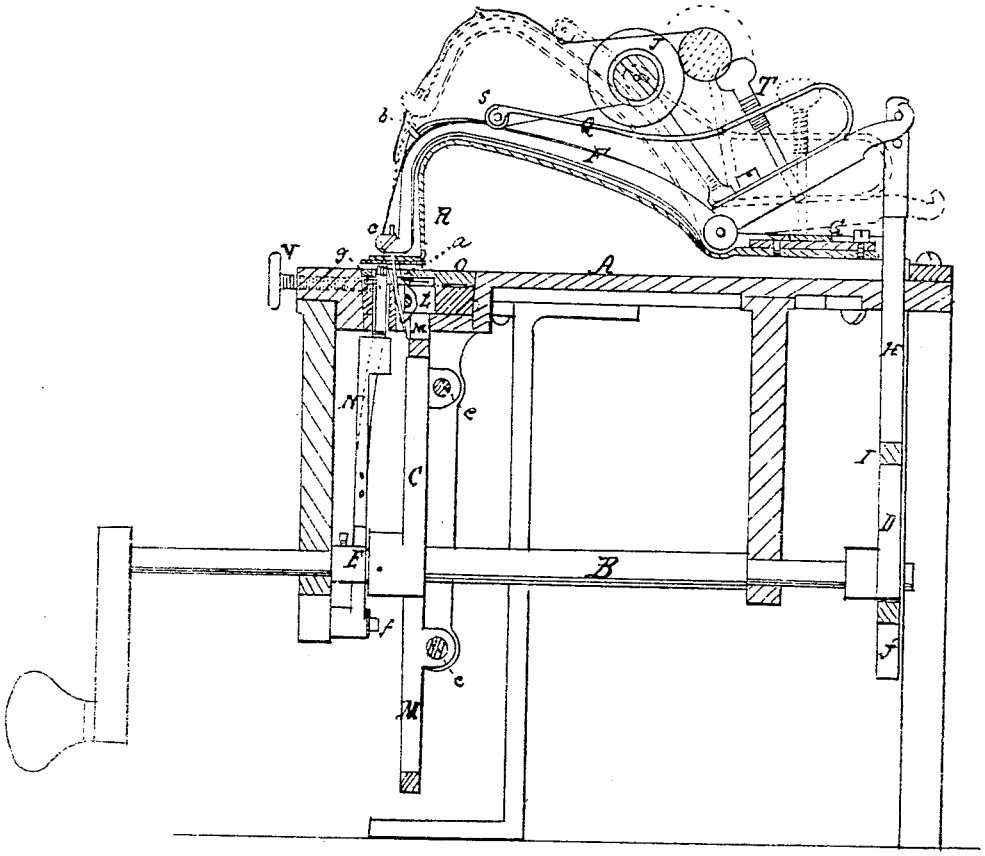
Figure 3:
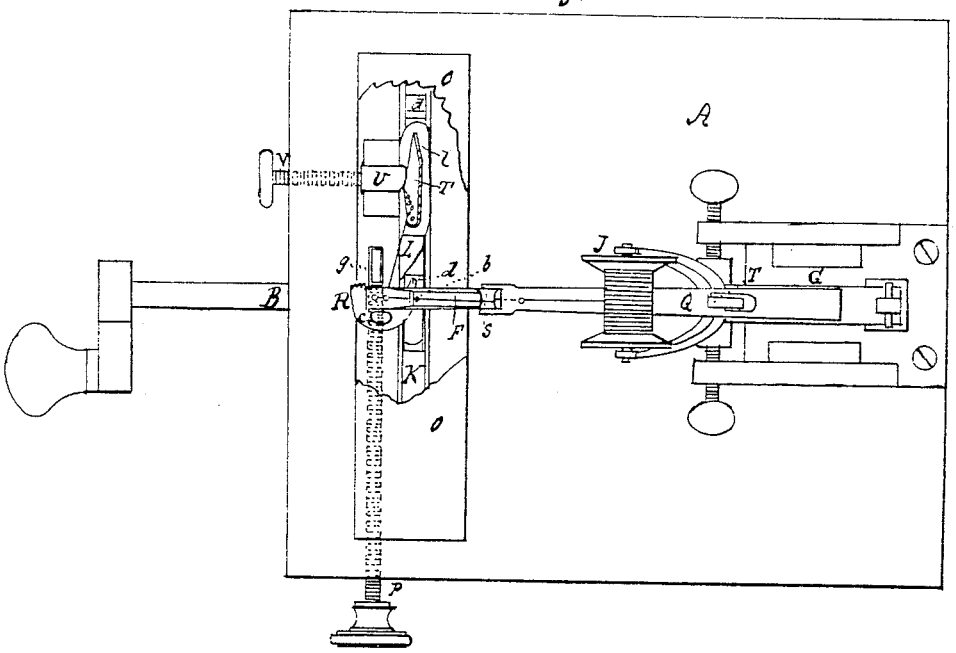
Figure 4:
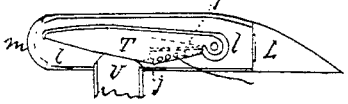
Figure 6:
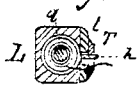
Figure 5:
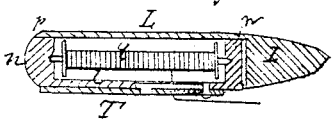
Figure 7:
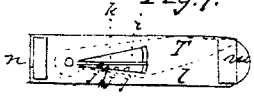

BEST AVAILABLE COPY

Sheet 1 - 3 Sheets.

J. Harrison, Jr.

Sewing Machine.

No 600

Reissued Sep. 14, 1858.

Fig. 1.

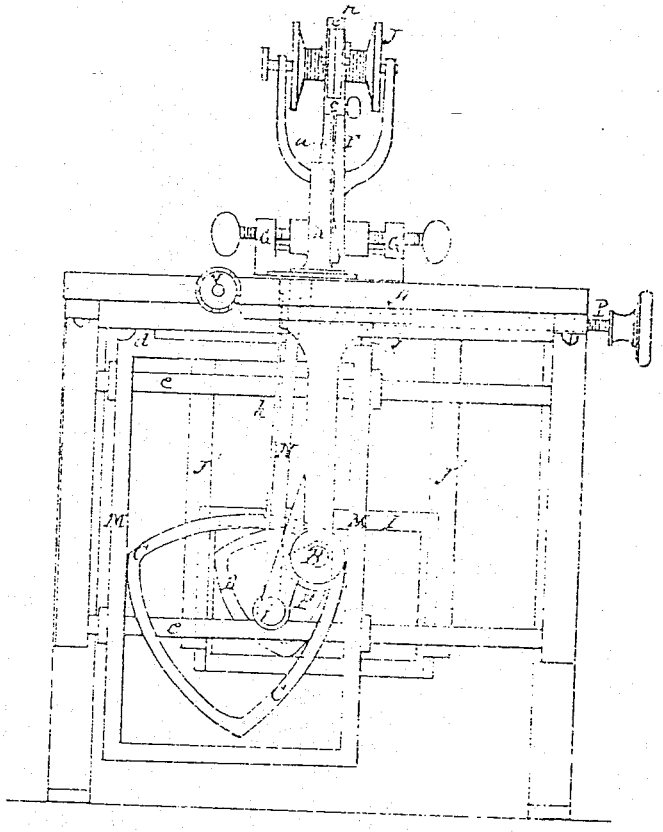

No. 600.—*Improvement in Sewing Machines.*—I claim clamping the thread of the needle at the downward or advancing movement of the needle by means that are operated intermittingly, substantially as and for the purposes herein set forth.

I also claim combining with the clamping means, as herein described, a set-screw or its equivalent, for adjusting the clamping means, so that the tightening of the stitch may be regulated to the degree desired.

I also claim the combination of the drag bar T attached to the shuttle, and containing the eye *j* through which the thread passes therefrom, the spring K for throwing the said bar into a position to prevent the delivery of the thread from the shuttle, and the adjustable liberating piece U for preventing the delivery of the thread from the shuttle and allowing the desired quantity to be given out.

I also claim constructing the shuttle in two parts, viz: the shell and cap, of which the latter is inserted into an [illegible]

BEST AVAILABLE COPY

Sheet 2-3 Sheets

J. Harrison, Jr.
Sewing Machine.

No. 600

Reissued Sep. 14, 1858.

J. Harrison Jr.
Sewing Machine

No. 600

Reissued Sep. 14, 1858

United States Patent Office

PTO - BOYERS, PA Duty Station

MISSING PAGE TEMPORARY NOTICE

PATENT # RE 600 FOR ISSUE DATE 9-14-1858

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Bib-Descrip & Claims

NOT AVAILABLE
at Boyers
10-19-93

Data Conversion Operation

Boyers, Pa